US005305194A

United States Patent [19]

MacDonald

[11] Patent Number: 5,305,194

[45] Date of Patent: Apr. 19, 1994

[54] METHOD AND APPARATUS FOR PREVENTING LOCAL BUNCHING OF CARS IN AN ELEVATOR GROUP WITH VARIABLE TRAFFIC FLOW

[75] Inventor: Robert MacDonald, West Caldwell, N.J.

[73] Assignee: Inventio AG, Hergiswil, Switzerland

[21] Appl. No.: 683,348

[22] Filed: Apr. 10, 1991

[51] Int. Cl.[5] .......... G06F 15/20

[52] U.S. Cl. .......... 364/400

[58] Field of Search .......... 395/910, 918; 364/400; 187/127

[56] References Cited

U.S. PATENT DOCUMENTS

| | | | |
|---|---|---|---|
| 4,081,059 | 3/1978 | Kuzunuki et al. | 187/29 R |
| 4,790,412 | 12/1988 | MacDonald et al. | 187/127 |
| 5,022,498 | 6/1991 | Sasaki et al. | 395/910 |
| 5,083,640 | 1/1992 | Tsuji | 395/910 |

FOREIGN PATENT DOCUMENTS

| | | |
|---|---|---|
| 0342008 | 11/1989 | European Pat. Off. . |
| 0385810 | 9/1990 | European Pat. Off. . |
| 2110423 | 6/1983 | United Kingdom . |

*Primary Examiner*—Roy N. Envall, Jr.
*Assistant Examiner*—Xuong Chung
*Attorney, Agent, or Firm*—Howard & Howard

[57] ABSTRACT

A method of minimizing car bunching at any traffic flow level allocates closely adjacent stops to a given car which is favored by a variable, readjustable distributor bonus. The estimated lost time costs of all passengers are computed for each elevator and for each hall call, these costs are reduced by a variable distributor bonus concentrating adjacent stops in one car, and a hall call is then allocated for service to that elevator which displays the lowest, reduced estimated lost time costs. In order to assure the function of this method equally at high and low traffic levels, the variable distributor bonus (Bvn) is readjusted to the traffic flow level (Va) which serves as a tracking parameter by means of a tracking function according to the relationship Bvn=Bv.F(Va) and the readjusted variable distributor bonus is defined thereby. The tracking function F(Va) is determined by one of artificial intelligence methods and expert programs. By the dependence of the distributor bonus on traffic flow, the desired small local bunching of elevator cars is an optimum for every traffic level. This method is applicable to a plurality of different allocation criteria, service requests and tracking parameters.

9 Claims, 4 Drawing Sheets

Fig.4a
Fig.4b
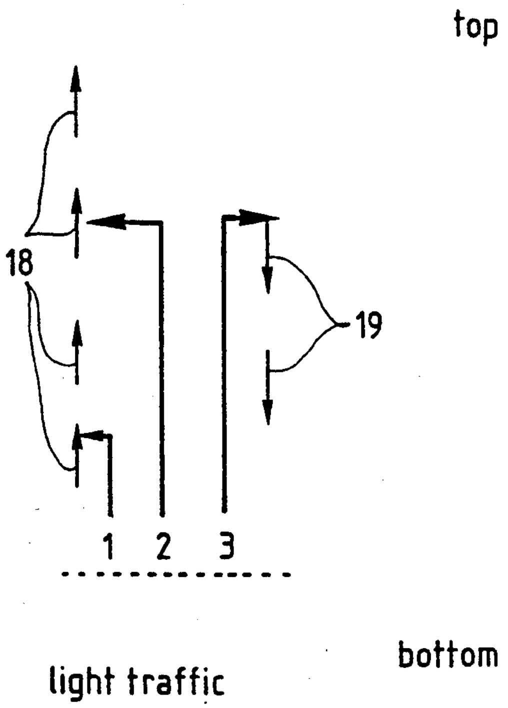
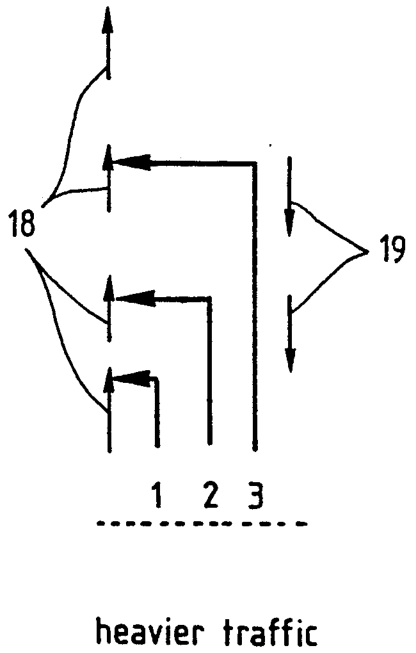

METHOD AND APPARATUS FOR PREVENTING LOCAL BUNCHING OF CARS IN AN ELEVATOR GROUP WITH VARIABLE TRAFFIC FLOW

BACKGROUND

The invention relates generally to elevator controls and, in particular, to a method and an apparatus for preventing local bunching of elevator cars in an elevator group with variable traffic flow.

Hall calls have been allocated to the cars in a group of elevator cars by a large number of different known strategies. The strategy disclosed in the U.S. Pat. No. 4,790,412 determines the estimated time of arrival (ETA) of each elevator car for a specific hall call to be allocated. A count is computed for each car, which count represents the time estimated for the car in question to reach the call floor with the proper service direction to serve the hall call. The hall call assignment is given to the car in the elevator group having the lowest ETA count. This strategy is based on calculating the estimated time of arrival (ETA) to every hall call in the building for each elevator car and then allocating a specific hall call to the car with the lowest ETA.

The concept of car distribution in an elevator system is apparent when the constantly changing patterns of elevator traffic are considered. If the dispatching strategy keeps the elevators well distributed throughout the building, for conditions other than morning up-peak, the cars are in a better position to respond to future hall calls. To accomplish this, some group controls resort to schemes that will spot cars throughout the building when traffic flow has subsided. However, spotting is inefficient. The cars are doing no useful work as they travel to parking floors, therefore wasting energy. The unnecessary wear and tear on the cars increases the maintenance costs.

U.S. Pat. No. 4,790,412 presents a better method for minimizing the bunching of the elevator cars in an ETA dispatching strategy by incorporating a algorithm for solving the distribution problem as part of the assignment algorithm itself. This distribution algorithm improves the distribution by considering previous allocations of the cars when making new allocations.

In the allocation algorithm, the floors of the building are processed sequentially from bottom to top for upward hall calls and from top to bottom for downward hall calls. In the calculation of ETA times for the cars, consideration is given to allocations that have already been made behind the floor that is currently being processed, called the "scan-floor", which is a hall call floor at which the scan has stopped for the purpose of allocating or re-allocating a hall call. This includes stops that a car is committed to make behind the scan-floor due to a car call. If a car is already committed to stops behind the scan-floor, then this car is given a greater chance of getting the allocation for the floor of the hall call being processed by calculating a dynamic bias value Tx and subtracting this bias value from the calculated ETA of the car.

The same procedure applies when a car has an intervening stop between the "present position" and the scan-floor. The "present position" or advanced position floor (avp-floor) is the actual floor location of the car when it is stationary, or it is the floor at which the car can make a normal stop when moving. This calculated dynamic bias Tx will favor the clustering of closely adjacent stops for a given car and thus minimize car bunching. The dynamic bias Tx is inversely proportional to a predetermined travel distance of the elevator car. The predetermined travel distance may be the same regardless of whether the intervening stop is due to a car call or an allocated hall call by using the travel distance between the "present position" of the elevator car being considered for allocation and the scan-floor as shown in the following equation I where K is a selected constant:

$$Tx = \frac{K}{Fl(scan) - Fl(avp)} \qquad (I)$$

The further in terms of travel distance that the scan-floor is from the avp-floor which the car is committed to make to serve its trip list, the smaller is the amount of time subtracted from the ETA of the car. Thus, if the car is a relatively long distance from the scan-floor, a bunching problem is less likely even when it has an intervening stop and the amount of bias reflects this by becoming insignificant.

As an alternative, the predetermined travel distance may depend on whether the intervening stop is due to an allocated hall call or due to a car call. An allocated hall call may be re-allocated, especially if the car is a relatively long way from the hall call floor. Thus, when the intervening stop is due to a hall call, the travel distance from the avp-floor to the scan-floor is used. However, if the intervening stop is due to a car call, which is a stop that the car will have to make, the bias in favor of giving the hall call allocation to the presently considered car may be increased by making the predetermined distance equal to the travel distance from the car call floor to the scan-floor.

The dynamic biasing according to the method shown in the U.S. Pat. No. 4,790,412 prevents a bunching of cars by clustering closely adjacent stops for a given car thereby maintaining a better car distribution throughout the building without placing "dummy" calls for parking floors. Due to this dynamic biasing, the chances are that the cars will already be suitably spaced one from the other as the cars become idle.

Although such a hall call allocation, which allocates closely adjacent stops to a single car, substantially reduces the local bunching of elevator cars, it does however entail a serious disadvantage. As can be seen from the equation I, the amount of biasing Tx is not sensitive to traffic flow levels. The same amount of bias is calculated regardless of the number of calls in the system, i.e. the measure against the local bunching of elevator cars is not re-adjusted to follow the traffic flow level. Although an assignment based on this strategy achieves good distributions with moderate traffic, it often leads to a poor distribution of elevators throughout the building at higher traffic levels. As the traffic flow increases, the elevators start bunching and rely on the randomness of the traffic patterns and the lowering of the traffic flow level to unbunch the cars. During times of high traffic flow level, the result is poor service and an increase in the average waiting time that a passenger has to wait for service. The average waiting time is an industry standard for the measuring of the efficiency of an elevator system.

SUMMARY OF THE INVENTION

The present invention provides a method and an apparatus in which the function of an elevator group is optimized by a suitable allocation of hall calls to the elevators. In the serving of calls, a function profile defined by a desired combination and weighting of elements from a predetermined set of function requirements and in which this suitable call allocation is determined is utilized. The function profile is executed by an allocation algorithm on the basis of an allocation criterion with regard to an allocation parameter with the same modifying bonuses and penalties according to a special strategy. A first function requirement is introduced into the allocation algorithm through the allocation criterion with regard to the allocation parameter and at least a second function requirement is also taken into consideration through modification of the allocation parameter by means of a bonus for favoring the corresponding function feature or by means of a penalty for discriminating against the corresponding complementary feature. The second function requirement is represented as keeping the local bunching of cars small and is favored through concentration of neighboring stops to a single car by means of a distributor bonus.

Accordingly, it is an object of the present invention to prevent the local bunching of elevator cars in elevator groups equally reduced for every traffic flow level and thereby reduce the mean waiting time.

Particularly in the case of high traffic flow levels, it is an object of the present invention to assure a uniform elevator distribution and be constructed as an integral part of the hall call allocation algorithm of the associated elevator control.

The invention will be described relative to a specific exemplary GVK dispatching system. It is to be understood however that the invention may be used to enhance any other type of dispatching system.

According to the method of the present invention, the allocation of the hall calls to the elevators for the call service is so chosen that the hall call service takes place, for example, with minimum estimated waiting time as a first function demand and the local bunching of cars is in that case kept small simultaneously as a second function demand. According to the amount of the distributor bonus, one of the measures can be preferred, i.e. weighted more heavily.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIGS. 4(*a*–*b*) show a three car example illustrating the basic concept of the present invention.

DESCRIPTION OF THE PREFERRED EMBODIMENT

For the purpose of detailing an exemplary application of the present invention, the disclosures of the above-cited U.S. Pat. No. 4,790,412, issued Dec. 13, 1988, as well as the U.S. Pat. application Ser. No. 07/659,022, entitled "Method and Apparatus for the Immediate Allocation of Hall Calls in Elevator Groups Based Upon Operating Costs and Variable Bonus and Penalty Point Factors", filed Feb. 20, 1991, are hereby incorporated into the specification of the present application by reference.

Figure 1:
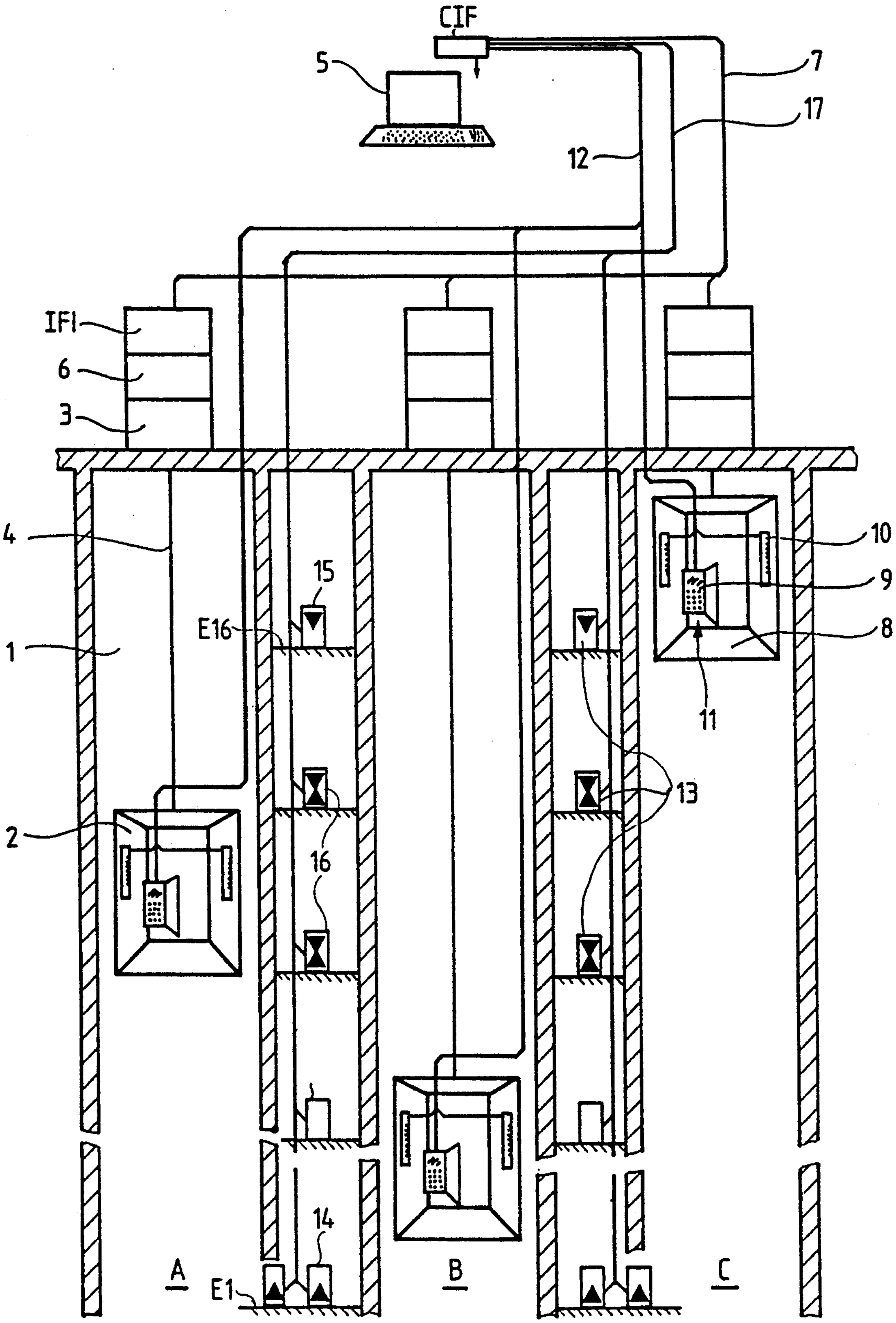
FIG. 1 is a schematic representation of an elevator system utilizing the present invention.

As shown in the FIG. 1, the elevators of an elevator group are denoted A, B, and C wherein a car 2 guided in an elevator shaft 1 for each elevator is driven in a known manner by a drive or hoist motor 3 by way of a hoisting cable 4 and to serve sixteen floors E1 to E16. The elevators may be of the hydraulic type or of the traction type as desired. Each hoist motor 3 is controlled by a drive control shown, for example, in the U.S. Pat. No. 4,337,847, wherein the target value generation, the regulating functions and the start-stop initiation are realized by means of an industrial type computer 5. The measuring and adjusting elements 6 which, by way of a first interface IF1 and an elevator bus 7, are connected with the computer 5 which provides group control to the elevators A, B, and C.

Each car 2 includes a load measuring device 8, call indicating devices 9 signaling the respective operating state Z of the car, a stop indicator 10 and a car operating panel 11. The devices 8, 9, 10 and 11 are connected by way of a car bus 12 With the computer 5. Car calls are recorded in the elevator cars A, B and C by suitable push button arrays incorporated in the car operating panel 11. They are then serialized and transmitted by way of the car bus 12 and a second interface CIF to the computer 5 along with any other car related information.

Hall calls are registered from suitable push buttons 13 located at the various floors E1 to E16 such as an "up" hall call push button 14 located at the lowest floor E1, a "down" hall call push button 15 located at the highest floor E16, and "up" and "down" hall call push buttons 16 located at each of the intermediate floors E1 to E15. Like the car calls, the hall calls are serialized and transmitted by way of a floor bus 17 and the input interface CIF to the computer 5. The hall calls are allocated for service to the individual cars 2 according to the demanded function profile by the use of a distributor bonus Bv according to the invention, which keeps the local bunching of the elevator cars small.

Figure 2:
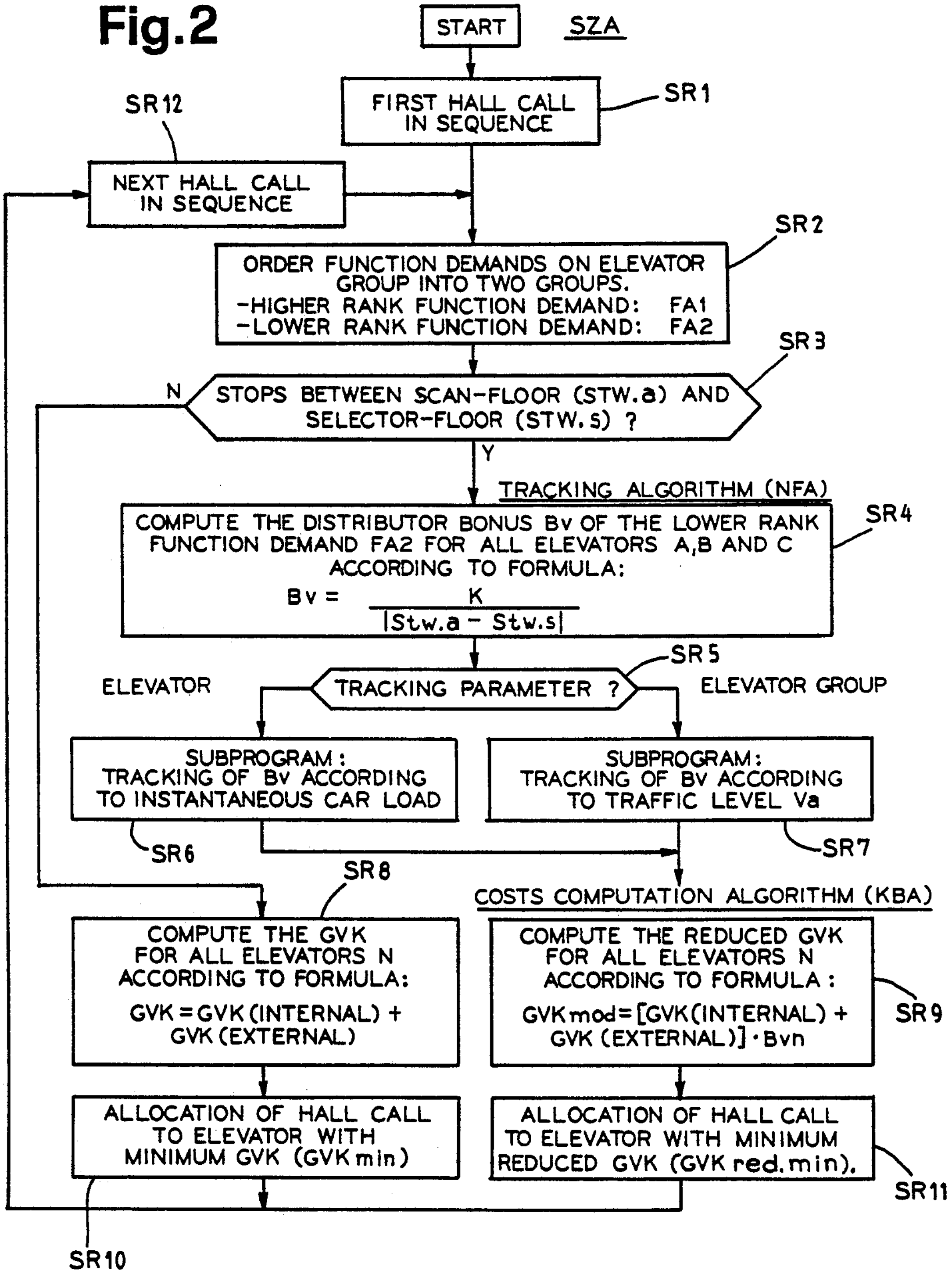
FIG. 2 is a logic flow diagram of a program which allocates hall calls to a group of elevators A, B and C in the elevator system shown in the FIG. 1.
Figure 3:
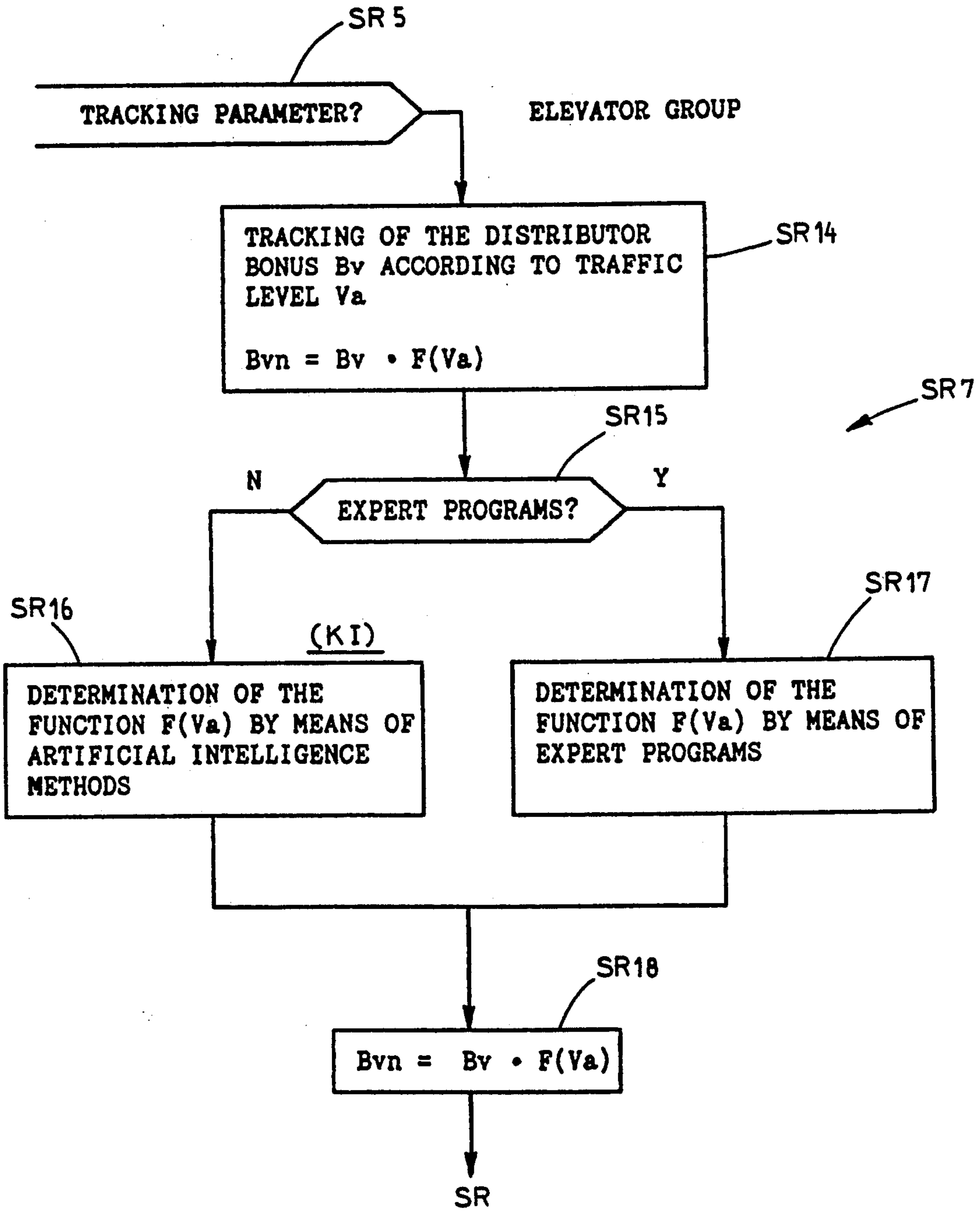
FIG. 3 is a logic flow diagram of the modification according to the present invention of the subroutine for computing the estimated lost time sum for a car to serve a specific hall call.

FIG. 2 shows the structure and the sequential course of a hall call allocation algorithm SZA with its two subordinate algorithms for the bonus re-adjustment, Tracking Algorithm NFA, and the lost time costs computation, Costs Computation Algorithm KBA, and, as shown in the FIG. 3, the subprogram NVA for the readjustment of the distributor bonus Bv according to the traffic flow level Va.

It can initially be presumed that the computer 5 is informed about the operating state of the elevator group A, B and c by way of the car bus 12, the elevator bus 7 and the floor bus 17. Therefore, for example, the load, the position and the operating state of the hoist motor 3 for each of the elevators A, B and C at any instant is being stored by the computer 5 which also possesses further details about the previous traffic history and the instantaneously valid bonuses B1 . . . . or penalties M1 . . . . . By reason of this information data, it is possible for the hall call allocation algorithm SZA to allocate newly entered hall calls to the elevators A, B and C in accordance with preset criteria, i.e. to determine a call allocation which is optimal according to these criteria. These criteria essentially concern function demands FA1, FA2 .... on the function of the elevator group. Such a call allocation takes place with the processing speed of the computer 5 in the course of the sequential call processing for all the floors E1, E2 ... continuously on the first scanning of the corresponding hall call to the instant immediately before its service.

The basis for the call allocation is the operating costs KNR, which are defined by an allocation parameter ZTP - which can be modified - and which are computed by a formula II as follows:

$$KNR = ZTP \text{ possibly modified by } (B1 \ldots / M1 \ldots), \quad \text{(II)}$$

wherein B1 .... are bonuses and M1 .... are penalties.

Operating costs KNR computed in such a manner represent a measure of the service capability of an elevator A, B and C in respect of a hall call and with regard to a demanded function profile of an elevator group. A call is then allocated for service to that elevator A, B or C which, at the instant of service, will foreseeably possess the greatest service capability, i.e. the allocation parameter ZTP of which will foreseeably best correspond to the allocation criterion ZTK and which will thus display the lowest operating costs KBN.

The preferred embodiment, which has been chosen for illustration according to the present invention for preventing the bunching of elevator cars, shall now be explained by reference to the hall call allocation algorithm SZA according to FIG. 2. This preferred variant of execution is characterized in that the estimated lost time costs GVK, designated servicing or operating costs KNR, are equal to the sum of the estimated lost times of all passengers GVK expressed in passenger-seconds. In order to reduce the bunching of the elevator cars, a variable distributor bonus Bvn is provided, i.e. a bonus which is re-adjustable according to a tracking function F(Va) of the traffic flow level Va, which is computed according to a special formula and which reduces the estimated lost time costs GVK multiplicatively to a reduced estimated lost time costs GVKred. Resulting from this are the following formulae III and IV for the reduced estimated lost time costs GVKred and the variable distributor bonus Bvn:

$$GVKred = GVK \cdot Bvn \quad \text{(III)}$$

$$Bvn = \frac{K}{|Stw.a - Stw.s|} \quad \text{(IV)}$$

where K is a selected constant, Stw.a is the scan-floor and Stw.s is the avp-floor (selector-floor).

According to the FIG. 2, the allocation method begins with a first step SR1 in which a registered, not yet served hall call is scanned. The allocation of this hall call now takes place not as desired, but in the sense of both of the functional demands FA1 and FA2 which form the basis of the group function. For this purpose, the functional demands FA1, FA2, .... are arranged hierarchically in a second step SR2 and in that case divided up into two groups, namely the first group for higher rank function demands contains FA1 and the second group for lower rank function demands contains FA2. This division is necessary because a distinction is made between both these groups in the subsequently described costs computation according to the steps SR8 and SR9 in that the higher rank function demand FA1 is represented by the estimated lost time costs GVK and the lower rank function demand FA2 is represented by the readjustable distributor bonus Bvn acting on GVK.

In a step SR3, it is ascertained whether the prerequisites for the application of the method according to the invention are present. This method consists of keeping the local bunching of cars small, so that closely adjacent stops are allocated to the same car. If, however, no stops are present between the scan-floor Stw.a and the selector-floor (avp-floor) Stw.s, there is no reason to use this method. In this case, the program branches at "N" and the hall call allocation takes place on the basis of the unmodified estimated lost time costs formula, as explained on pages 4 and 5 in the U.S. Pat. No. 4,355,705, and the hall call is, according to a step SR10, allocated for service to the elevator with the lowest unmodified estimated lost time costs GVKmin.

If, however, stops are ascertained in the step SR3 between the scan-floor Stw.a and the selector-floor Stw.s, the prerequisites for the application of the method according to the invention are given and the program branches at "Y". Therefore, the distributor bonus Bv, which assures the keeping small of the bunching of elevator cars, i.e. their uniform distribution in the elevator shaft, is computed according to the following formula V in a next step SR4:

$$Bv = \frac{K}{|Stw.a - Stw.s|} \quad \text{(V)}$$

wherein K represents a suitable chosen constant.

As a significant feature of the innovation according to the invention, the variable distributor bonus Bv is now however readjustable, i.e. it is readjusted according to the tracking parameter. According to a step SR5,, this can be related to a single elevator or to the entire elevator group. In the present example, the instantaneous traffic flow level Va is valid as a group-related tracking parameter and the corresponding tracking function F(Va) is determined according to a step SR7 by means of a special subprogram explained in more detail with reference to the FIG. 3. Regardless of whether an elevator-related or a group-related tracking parameter is concerned, the entry into the costs computation algorithm KBA takes place again by a step SR9. In this second case, i.e. in the presence of a variable, readjustable distributor bonus Bvn, the computation of the modified estimated lost time costs GVKmod takes place for all elevators A, B and C according to the following formula VI:

$$GVKmod = [GVK(internal) + GVK(external)] \cdot Bvn \quad \text{(VI)}$$

wherein: BVn is the distributor bonus Bv readjusted to follow the traffic flow level Va.

Finally, the allocation of the present hall call to that elevator of the elevator group A, B or C, which displays the lowest modified estimated lost time costs GVKred.min takes place in a last step SR11 analogously to the step SR10.

FIG. 3 shows the subprogram for the adaptive tracking of the distributor bonus Bv as illustrated in step SR7 of the FIG. 2. According to the step SR5, the group-related traffic flow level Va is again determined as the tracking parameter. Next, the tracking of the distributor bonus Bv according to the traffic level Va is illustrated in terms of a formula in a step SR14. The task of the subprogram now is to determine in the step SR14 the tracking function F(Va), according to which the traffic flow level Va readjusts the distributor bonus Bv. For this purpose, two modes of procedure are distinguished in the step SR15, namely derivation by way of artificial intelligence KI or utilization of existing expert knowledge. The determination of the function F(Va) thus takes place selectably in a step SR16 by means of KI-methods and in a step SR17 by means of expert programs. In both cases, a function F(Va) results, by which the variable distributor bonus Bv can be readjusted to follow the traffic flow level Va. In that case, F(Va) as the preferred variant of execution is, for example, a monotonic rising function of Va. This is illustrated in terms of a formula in a step SR18. Accordingly, the readjusted distributor bonus Bvn results through multiplicative action of the tracking function F(Va) on the variable distributor bonus Bv computed according to formula V. This acts according to the formula VI on the modification of the estimated lost time costs: the higher the traffic level, the greater the modification of the GVK of the car in subsequent adjacent allocations.

To further illustrate the concept according to the present invention, consider the three car example according to the FIG. 4. The "up" arrows 18 and the "down" arrows 19 represent hall calls. Consider also. that these arrows 18 and 19 at a low level of traffic will represent single hall calls and at higher levels represent multiple hall calls. FIGS. 4a and 4b represent allocations made with an allocation algorithm not using a readjustable distributor bonus Bvn, but a variable distributor bonus Bv with light and heavier traffic conditions. In this example, the FIG. 4a indicates a desirable distribution with light traffic. The FIG. 4b clearly indicates the degradation at higher traffic levels. The variability of the distributor bonus Bvn according to the invention, by accounting for the traffic flow level in the equation IV, shifts the distribution back to the desired one of the FIG. 4a providing for superior distributions at any traffic level.

In summary, the present invention concerns a method and apparatus for preventing local bunching of elevator cars in an elevator group with variable traffic flow level in which the function of the elevator group is optimized by a suitable allocation of hall calls to elevators in the serving of calls with regard to a function profile defined by a desired combination and weighting of elements from a predetermined set of function requirements (FA1, FA2, . . . . ) and in which the suitable call allocation is determined and executed by an allocation algorithm (SZA) on the basis of an allocation criterion (ZTK) with regard to an allocation parameter (ZTP) modifying bonuses (B) and penalties (M) according to a special strategy, wherein a first function requirement (FA1) is introduced into the allocation algoritum (SZA) through the allocation criterion (ZTK) with regard to the allocation parameter (ZTP) and at least a second function requirement (FA2) is also taken into consideration through modification of the allocation parameter (ZTP) by means of one of a bonus (B) for promotion of the corresponding function feature and a penalty (M) for inhibition of the corresponding complementary feature and wherein the second function requirement (FA2) consists of keeping the local bunching of cars small and is assured through allocation of neighboring stops to a single car by means of a distributor bonus (Bv). The present invention accomplishes its objectives by: arranging function requirements (FA1, FA2) defining the function profile of an elevator group hierarchically and dividing the function requirements for this purpose into at least two groups, namely into higher and lower ranking ones of the function requirements; defining as a higher rank function requirement hall calls which then are served with minimum estimated lost time costs (GVKmin) regarding all participating traffic participants, wherein the estimated lost time costs (GVK) of each individual elevator serve as an allocation parameter (ZTP) and an allocation criterion (ZTK) consists in the minimizing of the estimated lost time costs (GVK) associated with the serving of a call; defining as a lower rank function requirement (FA2) the keeping small of the local bunching of cars and allocating closely neighboring hall calls for service to the same car by providing a distributor bonus (Bv) which reduces the estimated lost time costs (GVK) in the allocation algorithm (SZA); readjusting the distributor bonus (Bv) as a variable distributor bonus (Bvn) for keeping the local bunching of cars small in its numerical value adaptively by groups to follow the traffic flow level of the elevator group; and utilizing the variable and readjustable distributor bonus (Bvn) as one of a subtrahend and a multiplier on the estimated lost time costs (GVK) to reduce the same subtractively and multiplivatively respectively.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for preventing local bunching of elevator cars in an elevator group with variable traffic flow level in which functioning of the elevator group is optimized by a suitable allocation of hall calls to the elevator cars which can serve the hall calls with regard to a function profile defined by a desired combination and weighting of elements from a predetermined set of function requirements (FA1, FA2, . . . . ) and in which the suitable allocation of the hall calls is determined and executed by an allocation algorithm (SZA) based on an allocation criterion (ZTK) with regard to an allocation parameter (ZTP) modifying bonuses (B) and penalties (M) according to a special strategy, wherein a first function requirement (FA1) is introduced into the allocation algorithm (SZA) through the allocation criterion (ZTK) with regard to an allocation parameter (ZTP) and at least a second function requirement (FA2) is also taken into consideration through modification of the allocation parameter (ZTP) by one of a bonus (B) for promotion of a corresponding function feature and a penalty (M) for inhibition of a corresponding complementary function feature and wherein the second function requirement (FA2) consists of keeping the local bunching of cars small and is assured through allocation of neighboring stops to a single car by a distributor bonus (BV), comprising the steps of:

a. determining a plurality of function requirements (FA1, FA2, . . . . ) which define a method of operation of an elevator group for allocation of registered hall calls to elevator cars of the elevator group;

b. responding to a registered hall call by ordering said function requirements hierarchically and dividing said function requirements into at least two groups, higher ranking function requirements and lower ranking function requirements;

c. defining hall calls as one of said higher ranking function requirements for serving the registered hall calls with minimum estimated lost time costs (GVKmin) regarding all of the elevator cars, wherein said estimated lost time costs (GVK) of each individual one of the elevator cars serve as an allocation parameter (ZTP) and an allocation criterion (ZTK) minimizes the estimated lost time costs (GVK) associated with serving the registered hall calls;

d. defining as one of said lower ranking function requirements minimizing local bunching of the elevator cars and allocating closely neighboring ones of the registered hall calls to one of the elevator cars by providing a distributor bonus (Bv) which reduces the estimated lost time costs in an allocation algorithm (SZA);

e. readjusting said distributor bonus (Bv) as a variable distributor bonus (Bvn) for minimizing the local bunching of the elevator cars to follow a traffic flow level of the elevator group;

f. utilizing the variable distributor bonus (Bvn) as one of a subtrahend and a multiplier on the estimated lost time costs to reduce the estimated lost time costs subtractively and multiplicatively respectively; and g. controlling the elevator car having the lowest estimated lost time costs to travel to and stop at a floor associated with the selected registered hall call.

2. The method according to claim 1 wherein the registered hall calls are served with a minimum estimated waiting time, an estimated waiting time for each of the elevator cars serves as said allocation parameter (ZTP) and said allocation criterion (ZTK) minimizes said estimated waiting time associated with service of the selected registered hall call.

3. The method according to claim 1 wherein a numerical value of said variable distributor bonus is indirectly proportional to a distance, a number of floors between a scan-floor (Stw.a) and a selector-floor (Stw.s), and is directly proportional to a function (F) of a traffic flow level (Va) of the elevator group and is readjusted to follow said traffic flow level group by group as defined by the equation:

$$Bvn = \frac{K}{|Stw.a - Stw.s|} \cdot F(Va),$$

K being a predetermined constant.

4. The method according to claim 1 wherein a numerical value of said distributor bonus is readjusted to follow one of group by group, according to a parameter of the elevator group, and elevator by elevator, according to a parameter of an individual one of the elevator cars.

5. The method according to claim 4 wherein one of artificial intelligence methods and expert programs is used for readjustment of said distributor bonus group by group and elevator by elevator respectively.

6. The method according to claim 1 wherein said steps a. through g. are performed immediately after a hall call is registered.

7. The method according to claim 1 wherein said steps a. through f. are performed repeatedly and said step g. is performed immediately before the registered hall call is served by one of the elevator cars.

8. A method for preventing local bunching of elevator cars in an elevator group with variable traffic flow level in which functioning of the elevator group is optimized by a suitable allocation of hall calls to the elevator cars which can serve the hall calls with regard to a function profile defined by a desired combination and weighting of elements from a predetermined set of function requirements (FA1, FA2, . . . . ) and in which the suitable allocation of the hall calls is determined and executed by an allocation algorithm (SZA) based on an allocation criterion (ZTK) with regard to an allocation parameter (ZTP) modifying bonuses (B) and penalties (M) according to a special strategy, wherein a first function requirement (FA1) is introduced into the allocation algorithm (SZA) through the allocation criterion (ZTK) with regard to the allocation parameter (ZTP) and at least a second function requirement (FA2) is also taken into consideration through modification of the allocation parameter (ZTP) by one of a bonus (B) for promotion of a corresponding function feature and a penalty (M) for inhibition of a corresponding complementary function feature and wherein the second function requirement (FA2) consists of keeping the local bunching of cars small and is assured through allocation of neighboring stops to a single car by a distributor bonus (Bv), comprising the steps of:

a. determining a plurality of function requirements (FA1, FA2, . . . . ) which define a method of operation of an elevator group for allocation of registered hall calls to elevator cars of the elevator group;

b. responding to a registered hall call by arranging said function requirements hierarchically and dividing said function requirements into at least two groups, higher ranking function requirements and lower ranking function requirements;

c. defining hall calls as one of said higher ranking function requirements for serving the registered hall calls with minimum estimated lost time costs (GVKmin) regarding all of the elevator cars, wherein said estimated lost time costs (GVK) of each individual one of the elevator cars serve as an allocation parameter (ZTP) and an allocation criterion (ZTK) minimizes the estimated lost time costs (GVK) associated with serving the registered hall calls;

d. determining whether any of the elevator cars have a stop at a floor between a scan floor and a selector floor;

e. if no stops are present between the scan floor and the selector floor, computing the estimated lost time costs for each of the elevator cars, controlling the elevator car having the lowest estimated lost time costs to travel to and stop at a floor associated with the selected registered hall call and returning to the step b.;

f. if at least one stop is present between the scan floor and the selector floor, defining as one of said lower ranking function requirements minimizing local bunching of the elevator cars and allocating closely neighboring ones of the registered hall calls to one of the elevator cars by providing a distributor bonus (Bv) which reduces the estimated lost time costs in an allocation algorithm (SZA);

g. selecting a tracking parameter related to one of the elevator cars and the elevator group, if the elevator car related tracking parameter is selected, tracking the distributor bonus according to instantaneous car load and, if the elevator group related tracking parameter is selected, readjusting said distributor bonus (Bv) as a variable distributor bonus (Bvn) for minimizing the local bunching of the elevator cars to follow a traffic flow level of the elevator group;

f. utilizing the variable distributor bonus (Bvn) as one of a subtrahend and a multiplier on the estimated lost time costs to reduce the estimated lost time costs subtractively and multiplicatively respectively; and g. controlling the elevator car having the lowest estimated lost time costs to travel to and stop at a floor associated with the selected registered hall call.

9. An elevator control apparatus for preventing local bunching of elevator cars in an elevator group with variable traffic flow level in which functioning of the elevator group is optimized by a suitable allocation of hall calls to the elevator cars serving the hall calls with regard to a function profile defined by a desired combination and weighting of elements from a predetermined set of function requirements (FA1, FA2, . . . . ) and in which the suitable call allocation is determined and executed by an allocation algorithm (SZA) based on an allocation criterion (ZTK) with regard to an allocation parameter (ZTP) modifying bonuses (B) and penalties (M) according to a special strategy, wherein a first one of said function requirements is introduced into the allocation algorithm (SZA) through the allocation criterion (ZTK) with regard to the allocation parameter (ZTP) and at least a second one of the function requirements is also taken into consideration through modification of the allocation parameter (ZTP) by one of a bonus (B) for promotion of a corresponding function feature and a penalty (M) for inhibition of a corresponding complementary function feature and wherein the second function requirement consists of minimizing the local bunching of the elevator cars and is assured through allocation of hall calls representing neighboring stops to one of the elevator cars by a distributor bonus (Bv), comprising:

means connected to a plurality of elevator cars of an elevator group for receiving signals representing operating information of the elevator cars;

means connected to push buttons located at floors served by the elevator cars of the elevator group for receiving hall call signals generated from the push buttons and for registering the hall call signals as hall calls to be served by the elevator cars;

means for selecting a registered hall call for allocation to one of the elevator cars of the elevator group;

means for arranging function requirements (FA1, FA2, . . . . ) defining a function profile of the elevator group hierarchically and dividing said function requirements into at least two groups, higher ranking function requirements and lower ranking function requirements;

means for defining registered hall calls as one of said higher ranking function requirements for serving the registered hall calls with minimum estimated lost time costs (GVKmin) regarding all participating traffic participants, wherein the estimated lost time costs of each individual one of the elevator cars serve as an allocation parameter (ZTP) and an allocation criterion (ZTK) consists of minimizing the estimated lost time cost associated with serving the selected registered hall call;

means for defining as one of said lower ranking function requirements minimizing local bunching of the elevator cars and allocating closely neighboring hall calls to one of the elevator cars by providing a distributor bonus (Bv) which reduces the estimated lost time costs in an allocation algorithm (SZA);

means for readjusting the distributor bonus as a variable distributor bonus (Bvn) for minimizing local bunching of the elevator cars in its numerical value by groups to follow the traffic flow level of the elevator group; and means for utilizing said variable distributor bonus as one of a subtrahend and a multiplier on the estimated lost time costs to reduce the estimated lost time costs subtractively and multiplicatively respectively; and means connected to the elevator cars and responsive to the selected registered hall call for controlling the elevator car having the smallest estimated lost time costs to travel to and stop at a floor associated with the selected registered hall call.

* * * * *